May 1, 1962 M. KATZ 3,032,145
HYDRAULIC SHOCK ABSORBER
Filed April 27, 1959
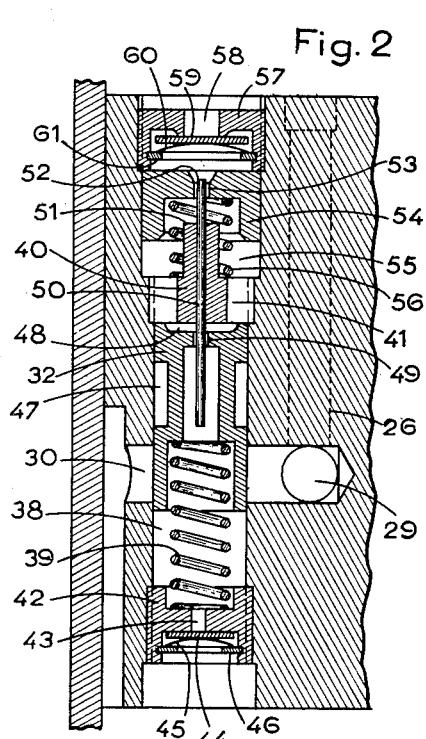
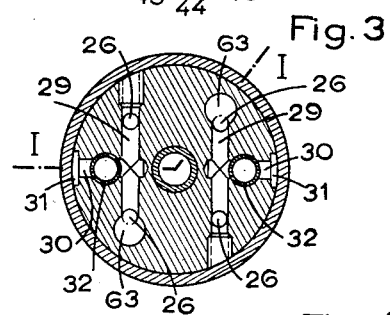
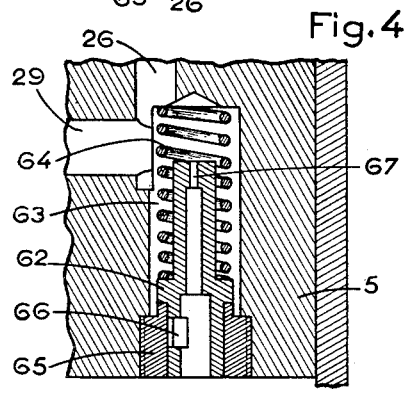
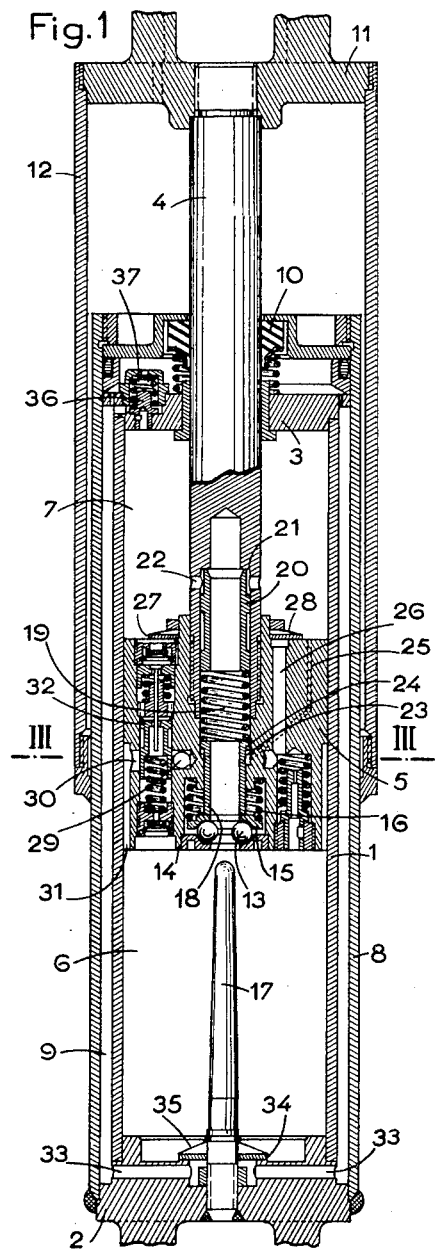
INVENTOR
MAURICE KATZ
BY Cameron, Kerkam & Sutton
ATTORNEYS

United States Patent Office 3,032,145
Patented May 1, 1962

3,032,145
HYDRAULIC SHOCK ABSORBER
Maurice Katz, 71 Rue Raynouard, Paris, France
Filed Apr. 27, 1959, Ser. No. 809,172
Claims priority, application France July 9, 1958
5 Claims. (Cl. 188—88)

The present invention relates to a hydraulic shock absorber with automatic locking and unlocking of its components and more particularly to shock absorbers of the type comprising a cylinder integral with one of the two parts of a vehicle connected one to the other by a resilient suspension, and a piston integral with the other part forming in the cylinder two chambers filled with liquid, the said piston, when moving relative to the cylinder, passing liquid from one chamber to the other through conduits provided with flow-controlling members.

A shock absorber which can be locked temporarily is useful when it is important to effect a damping of oscillations due, when the vehicle is in motion, to the oscillations of the resilient suspension members, and to prevent such deflections when the vehicle is stationary. This problem arises in particular with all vehicles called upon to move over more or less level terrain, and capable of receiving, more or less abruptly, when stationary, great variations in loads or forces, thus subjecting the suspended part of the vehicles to oscillations which would prevent their use as stable platforms. Amongst these are vehicles which carry cranes, shovels or other weight handling machines, mobile platforms for the maintenance of overhead wires and certain wheeled or tracked vehicles for military purposes.

In order to attain the stability of the suspended part of the stationary vehicle hydraulic shock absorbers are known comprising manually operated supplementary obturator members which temporarily interrupt the communication between the two chambers. This solution has the disadvantage of requiring a complex system of external pipings more or less exposed to deterioration and requiring manual operation which may be time consuming or completely overlooked.

In the shock absorber of the present invention, locking is automatically effected during when the vehicle is stationary, while unlocking is automatically maintained during movement thereof by oscillations imposed on the suspension by the unevenness of the ground.

According to the invention the shock absorber comprises, in each of the conduits for the transfer of liquid from one chamber to the other when the piston moves in either direction, an obturator member subject to the action of a resilient biasing force in the direction of obturation of the conduit, and, in the direction of opening of the conduit, to impulses supplied by the liquid under pressure by the movement of the piston in the opposite direction.

In the accompanying drawing a particular embodiment of a shock absorber according to the invention is shown, and hereinafter is described, by way of example. In the drawing:

FIGURE 1 is a longitudinal section of the shock absorber on the line I—I of FIGURE 3;

FIGURE 2 is an axial section of the obturator locking member, on a larger scale;

FIGURE 3 is a transverse section of the shock absorber on the line III—III of FIGURE 1; and FIGURE 4 is an axial section on a larger scale, showing a supplementary control member governing communication between the two chambers.

In the several figures a cylinder 1 is provided at its lower end with a bottom 2 connected to a non-suspended part of a vehicle. At its upper portion, the cylinder 1 is closed by end 3, through which passes the rod 4 of a piston 5 moving in the cylinder 1, cylinder 1 is divided thereby into two chambers 6 and 7. The cylinder 1 is surrounded by a cylindrical shell 8 forming an annular compensation chamber 9. At its upper end shell 8 carries a packing 10 providing a seal around piston rod 4. Rod 4 is attached to a bracket 11 connected to a suspended part of the vehicle. A protective sheath 12 is mounted on bracket 11 and slides over shell 8.

A circle of balls 13 is mounted between a race 14 in an axial bore in piston 5 and a movable race 15 biased by spring 16. These races are so profiled that when balls 13 are moved radially by contact with tapered spindle 17 on bottom 2 of the cylinder 1, as piston 5 moves relative to cylinder 1, race 15 is raised. Race 15 then raises pusher tube 18, and compresses spring 19 exerting force on a tubular valve 20 centered in an axial bore in piston rod 4. The upper portion of valve 20 is provided with an annular chamber 21 in communication with chamber 7 through two radial ports 22.

A second annular chamber 23 of the same section as chamber 21 is provided in piston 5 below a shoulder 24 on the upper end of pusher tube 18. Chamber 23 communicates through two ducts 25 with chamber 7.

Chambers 6 and 7 communicate with one another through two vertical ducts 26 in piston 5, which open into chamber 7. A flap 27 biased by spring 28 closes ducts 26 at chamber 7. Ducts 26 open into horizontal ducts 29 and 30 (FIGURE 3) which open into recesses 31 provided in the periphery of the piston 5. Obturator slide valves 32 are arranged on ducts 30 and will be described later herein.

Annular compensation chamber 9 communicates at its lower end with chamber 6 through ducts 33 controlled by flap 34 biased by springs 35. At its upper end chamber 9 communicates with chamber 7 through flap valve 36 mounted on end 3 and biased by a calibrated spring 37.

Upon a contraction of the shock absorber resulting from a deflection of the resilient suspension system of the vehicle, spindle 17 penetrates into the circle of balls 13 expanding the circle and raising pusher tube 18. Spring 19 is compressed proportionally to the stroke of cylinder 1 with respect to piston 5. Liquid from chamber 6 flows freely towards chamber 7 through recesses 31 and ducts 30, 29 and 26, lifting flap 27. Excess liquid in chamber 7 displaced by entrance of piston rod 4, is discharged through flap 36 into compensation chamber 9.

The resistance opposing contraction of the shock absorber is determined by the fluid pressure in chambers 6 and 7 acting on an area of the piston 5, which is equal to the area of the cross section of piston rod 4.

When the contraction movement of the shock absorber has terminated, expansion of the resilient suspension system causes expansion of the shock absorber. The liquid contained in chamber 7 is compressed by piston 5, and cannot flow into chamber 6 without overcoming the resistance of valve 20. Resistance of valve 20 is a function of the compression of spring 19 and the amplitude of the preceding contraction movement. The pressure in annular chamber 23 is maintained on pusher tube 18 against the compression of spring 19 until the end of the expansion movement which is therefore opposed by a constant resistance. At the end of expansion pusher tube 18 returns with movable race 15 to starting position and the shock absorber is ready for another loading when the next deflection of the vehicle suspension takes place.

In the shock absorber according to the invention, the contraction of the shock absorber and the deflection of the suspension when the vehicle is at a standstill are prevented by obturator slide valves 32 arranged on each of horizontal ports 30.

As shown in FIGURE 2 obturator 32 is guided in a vertical bore 38 passing through port 30. Spring 39 biases obturator 32 against screw plug 40, provided with orifices 41. Spring 39 abuts on diaphragm 42 screwed into the lower portion of bore 38. Diaphragm 42 has a central orifice 43 obturated by flap 44 which is closed by spring 45 carried by resilient ring 46 which is engaged in diaphragm 42.

An annular chamber 47 is provided in slide valve 32 which allows liquid to flow into port 30, when slide valve 32 is in its lower position. A pan 48 is provided in the upper portion of slide valve 32 which is in communication with an axial bore in slide valve 32 through a restricted orifice 49. The diameter of pan 48 is such that communication is maintained between the bore of the slide valve 32 and orifices 41.

A rod 50 integral with plug 40 passes through orifice 49 of slide valve 32 with slight clearance. Plug 40 has an upper shoulder 51. The upper end 52 of rod 50 passes with slight clearance through orifice 53 provided in a small piston 54 sliding in chamber 55 which is co-axial to the bore 38. Piston 54 is engaged by spring 56 mounted on plug 40. The upward stroke of piston 54 is limited by engagement with diaphragm 57 which is screwed into the upper portion of the chamber 55. In diaphragm 57 is central orifice 58 which is obturated by a flap 59 closed by spring 60 which is carried by resilient ring 61 mounted in diaphragm 57.

Locking of the shock absorber is obtained as follows:

In the at rest position as illustrated in FIGURE 2, slide valve 32 and piston 54 are in their upper limit positions because of springs 39 and 56. Port 30 is obturated by slide valve 32 and prevents passage of liquid from chamber 6 to chamber 7 through recesses 31 and vertical ducts 26. All the cavities between diaphragms 42 and 57 are filled with liquid.

When the vehicle is loaded abruptly and the suspension thereof deflected, piston 5 puts pressure on the liquid in chamber 6. The liquid cannot flow into the chamber 7 and opposes contraction of the shock absorber and the suspended part of the vehicle is immobilised. Expansion of the shock absorber when the suspension extends is possible because the liquid is allowed to flow from chamber 7 into the chamber 6 through valve 20 by overcoming the predetermined resistance of spring 19.

When the vehicle is first moved obturator valve 32 opposes any contraction of the shock absorber. The suspension members expand during movement of the vehicle and expansion movement of the shock absorber producing excessive pressures in chamber 7. A small fraction of the liquid contained in chamber 7 then passes through orifice 58 of diaphragm 57 by opening flap 59 and piston 54 is forced down. The liquid in chamber 55 is discharged by piston 54 through orifices 41 and pushes slide valve 32 down against the bias of the spring 39. After a predetermined movement which may result from a single or from several strokes of valve 54, slide valve 32 completely uncovers port 30 and eventually engages diaphragm 42, where it remains held by pressure exerted by subsequent impulses and port 30 remains open.

When the volume of liquid which has entered through orifice 58 exceeds the capacity of the chamber 55, piston 54 engages stud 51 of plug 40, obturating the small annular orifice 53 so that the quantity of liquid discharged into chamber 48 is substantially the same for each impulse resulting from an expansion movement of the shock absorber, regardless of amplitude of such movement.

As will be seen, the piston 54 acts as a closing member permitting passage of the quantity of liquid required from moving slide valve 32 in one or two steps to its open position. Slide valve 32 is subsequently held open when piston 54 abuts stud 51 of plug 40 by liquid pressure resulting from expansion movements of the shock absorber.

The shock absorber then operates normally, offering only a weak resistance to contraction movements, and an increased resistance, controlled by valve 20 to expansion movements.

The return of liquid to chamber 7 is resisted by flap 59.

When the piston 54 tends to rise under the action of its spring 56 liquid is trapped above piston 54 and flows through a small annular orifice 53 and again fills chamber 55. Slide valve 32 also tends to rise under the action of its spring 39 and the liquid between slide valve 32 and plug 40 flows through the small annular orifice 49 so that the rate of rise of slide valve 32 is a function of the discharge permitted by orifice 49.

When the vehicle stops expansion movements of the shock absorber stop, no fluid passes through orifice 58 and slide valve 32 returns to its position obturating port 30 to prevent any transfer of liquid from chamber 6 to chamber 7. The shock absorber is then locked.

Flap 44 on diaphragm 42 opposes flow of the liquid in chamber 6 towards chamber 38 upon contraction of the shock absorber, and thus prevents the liquid from moving slide valve 32 towards its obturating position. Flap 44 permits discharge of liquid from chamber 38 towards chamber 6 when slide valve 32 is pushed downward in the opening of port 30.

Thus the apparatus functions as an oscillation shock absorber when repeated expansions at high cadence of the telescopic system when the vehicle is in motion hold slide valve 32 in its open position and functions as a lock for the suspension when expansions cease, or occur at such time intervals that slide valve 32 remains in its obturating position.

In certain cases absolute locking of the shock absorber may be undesirable because of excessive forces imposed on the different members of the shock absorber or on the vehicle.

In order to meet this danger, a supplementary control member for the passage of liquid from chamber 6 to chamber 7 is provided between the chamber 6 and at least one of the vertical ducts 26 opening into chamber 7.

Such a supplementary control member is illustrated at the right of FIGURE 1, and, on a larger scale, in FIGURE 4. As shown in FIGURE 4, the control member includes a piston 62 and biased toward closed position by spring 64. In closed position piston 62 abuts nuts 65 screwed into piston 5 and covers a slot 66 provided in piston 62 within nut 65.

When the pressure in chamber 6 exceeds a predetermined value, piston 62 rises and slot 66 is uncovered and permits flow of liquid toward the vertical duct 64. Piston 62 thus provides a safety valve which limits the pressure in chamber 6 and the locking resistance to a desired value.

A capillary orifice 67 in piston 62 is a permanent connection between chambers 6 and 7 to provide a slow displacement of the components of the shock absorber for mounting and servicing.

Hereinabove, for simplicity's sake, the description of the invention has been limited to a single locking device; however, as shown in FIGURE 3, two or more locking devices may be provided in piston 5.

In order to further simplify the description of and the functioning of the shock absorber of the invention, the description has been limited to a shock absorber in which locking is effected in one direction only, viz. that of contraction. However, it will be understood, that a second locking device of a similar construction, may be provided for locking the shock absorber in the other sense, viz. that of expansion.

For locking in direction of expansion ducts 22, which control the flow of liquid from chamber 7 to chamber 6 are controlled by slide valve 32 similar to which controls port 30. The movements thereof will then be displacements of very small amplitude in both directions corresponding to the volumes of liquid discharged by the respective pistons 54.

The shock absorber as described hereinabove by way of example may be modified or supplemented by any suitable accessory member, within the scope of the present invention.

Thus the locking device, instead of being built into the piston, may be inserted into a separate duct of the piston in communication between the two shock absorber chambers. The locking device may then be arranged at one end or the other, on the side of and even outside the shock absorber.

The locking device, instead of being mounted on a shock absorber of the type described and illustrated, may be used with hydraulic shock absorbers constructed in different manner, but having a movable piston separating two working chambers filled with liquid.

What I claim is:

1. A hydraulic shock absorber for use with a vehicular suspension of the type which is automatically locked when the vehicle is at rest and which is automatically unlocked when the vehicle is in motion, said absorber having a piston connected to and movable by deflection of said suspension and two chambers filled with liquid and separated by the piston, a duct for transferring liquid between said chambers upon movement of said piston, flow-control means in said duct, an additional means for preventing transfer of liquid through said duct comprising an obturator member for said duct, resilient means biasing said obturator member to position closing the duct when the vehicle is at rest, and means for moving said obturator member to position opening the duct and for holding said obturator member in said open position when said vehicle is in motion, said last named means being actuated by liquid forced from that one of said chambers which is contracted by movements of said piston in the direction opposed to the direction of the movements locking the shock absorber.

2. Apparatus as described in claim 1 in which said obturator member comprises a slide valve, a cylinder in said piston in which said slide valve is mounted, and a non-return flap admitting liquid under pressure to said cylinder to move said slide valve to said open position.

3. Apparatus as described in claim 1 in which said obturator member includes a restricted leakage orifice controlling slow displacement of said obturator member towards its obturating position by said obturator biasing means.

4. Apparatus as described in claim 1 in which said obturator member comprises a slide valve, a cylinder in the piston receiving said slide valve and means for admitting fluid under pressure to said cylinder including a closing member, a second piston for said closing member, two cavities in said cylinder separated by said second piston, a non-return flap between one of said cavities and the adjacent shock absorber chamber and resilient means biasing said second piston toward said flap.

5. Apparatus as described in claim 4 including a duct of restricted cross sectional area in said second piston between said cavities whereby slow displacement of said second piston against the action of said resilient biasing means is provided in direction opposite to that of the direction of the liquid entering through said flap from the adjacent shock absorber chamber.

References Cited in the file of this patent
UNITED STATES PATENTS

| | | |
|---|---|---|
| 1,409,849 | Haeberlein | Mar. 14, 1922 |
| 1,592,373 | Lovejoy | July 13, 1926 |
| 2,240,644 | Focht | May 6, 1941 |
| 2,465,680 | Focht | Mar. 29, 1949 |
| 2,521,202 | Cloudsley | Sept. 5, 1950 |
| 2,803,313 | Ulmann | Aug. 20, 1957 |
| 2,865,396 | Focht | Dec. 23, 1958 |
| 2,866,633 | Schnitzer | Dec. 30, 1958 |
| 2,937,724 | Schnitzer | May 24, 1960 |
| 2,957,703 | Ross | Oct. 25, 1960 |